E. E. HOWSON.
FILTERING DEVICE.
APPLICATION FILED OCT. 5, 1917.

1,284,347.

Patented Nov. 12, 1918.
5 SHEETS—SHEET 1.

WITNESSES

INVENTOR
Ellis E. Howson
BY
ATTORNEYS

E. E. HOWSON.
FILTERING DEVICE.
APPLICATION FILED OCT. 5, 1917.

1,284,347.

Patented Nov. 12, 1918.
5 SHEETS—SHEET 3.

WITNESSES
George D. Blume.
G. L. Kitchin

INVENTOR
Ellis E. Howson
BY
ATTORNEYS

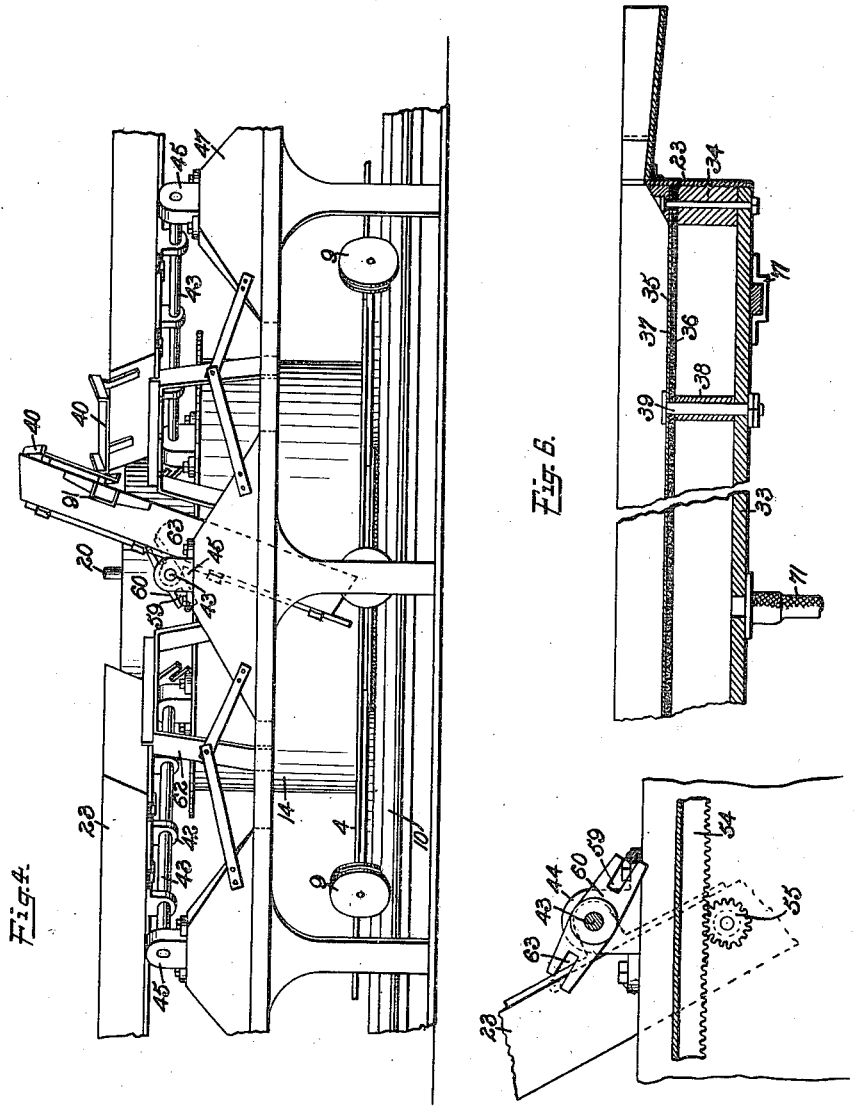

E. E. HOWSON.
FILTERING DEVICE.
APPLICATION FILED OCT. 5, 1917.

1,284,347.

Patented Nov. 12, 1918.
5 SHEETS—SHEET 5.

WITNESSES
George L. Blume.
A. L. Kitchin.

INVENTOR
Ellis E. Howson
BY
ATTORNEYS

UNITED STATES PATENT OFFICE.

ELLIS EDGAR HOWSON, OF SALT LAKE CITY, UTAH.

FILTERING DEVICE.

1,284,347.   Specification of Letters Patent.   Patented Nov. 12, 1918.

Application filed October 5, 1917. Serial No. 194,929.

*To all whom it may concern:*

Be it known that I, ELLIS EDGAR HOWSON, a citizen of the United States, and a resident of Salt Lake City, in the county of Salt Lake and State of Utah, have invented a new and Improved Filtering Device, of which the following is a full, clear, and exact description.

This invention relates to an improved filtering device in which any pulverized solid in suspension may be filtered for extracting certain parts thereof, as for instance ore containing precious metal, and has for an object the provision of means whereby the parts are continuously operated but in succession so that each part will go through a number of stages for a complete cycle.

Another object in view is to provide a rotatable distributing construction and filtering means associated therewith designed to be supplied with the matter in suspension to be filtered and then operated in a plurality of different ways in succession so as to extract part of the solids in suspension and discharge the remaining solids at a given time.

A still further object in view is to provide a filtering device circular in construction and arranged with a number of independent filtering elements with independent connections whereby each filtering element will successively operate as the matter in suspension is continuously supplied to the device, whereby there will be a constant and substantially even output as long as the device is in use.

In the accompanying drawings:

Fig. 4 is a fragmentary side elevation of part of the structure shown in Fig. 1, one of the filtering members being shown tilted.

Fig. 5 is a detail fragmentary sectional view showing part of one of the filtering members in a tilted position.

Fig. 6 is an enlarged detail fragmentary sectional view through Fig. 2 on line 6—6.

Figure 1:
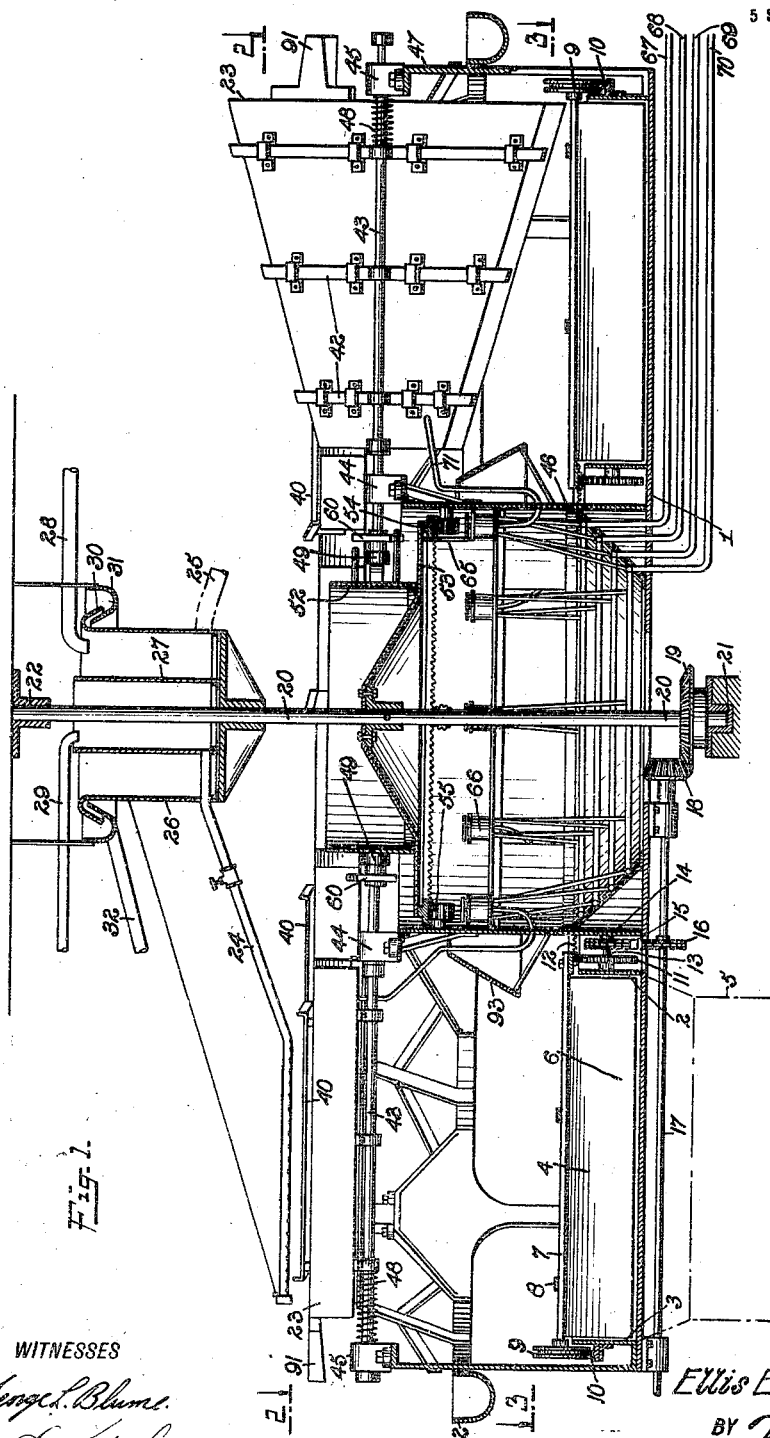
Figure 1 is a longitudinal vertical section through Fig. 2 on line 1—1.
Figure 3:
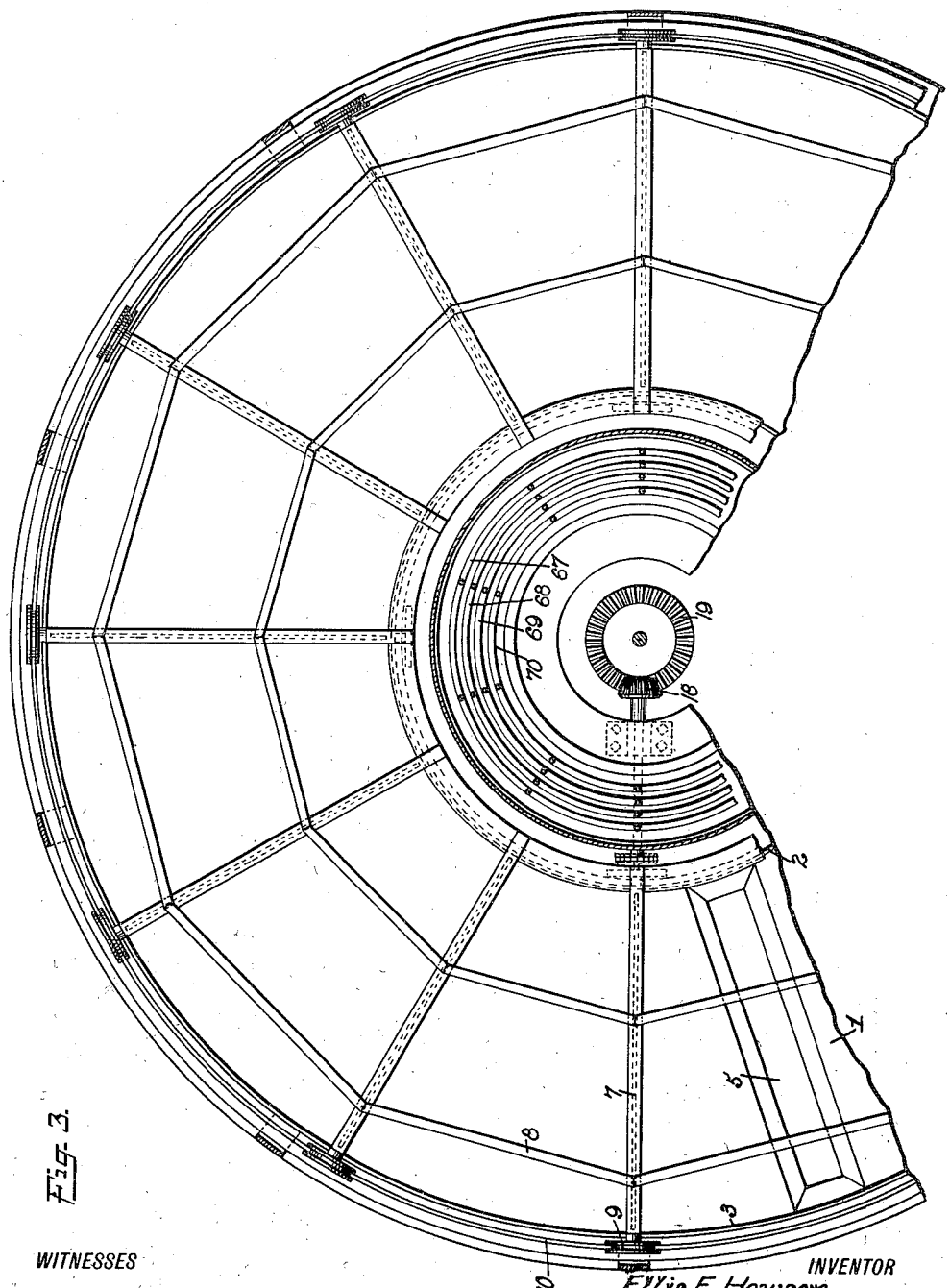
Fig. 3 is a section through Fig. 1 on line 3—3.
Figure 9:
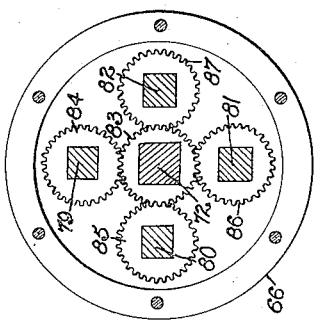
Fig. 9 is a horizontal sectional view through Fig. 8 on line 9—9.

Referring to the accompanying drawings by numerals, 1 indicates a foundation or platform which is fixed or stationary and is provided, as shown in Fig. 1, with upright walls 2 and 3, said walls extending in circles as shown in Fig. 3 so as to accommodate the circular conveyer 4. A discharge opening 5 is provided at a convenient point in the platform 1 so that the matter discharged between the walls 2 and 3 may be moved by conveyer 4 to the discharge point and from thence disposed of as may be desired. The conveyer 4 is made up of a number of boards or webs 6 secured to the bars 7, said webs acting as blades for moving the material around to the discharge opening 5. A plurality of bracing members 8 connect the bars 7 so that the entire structure will move together and be braced so as to resist any extra strain at any particular point. Each of the bars 7 at the outer end has a grooved wheel 9 mounted thereon running on a track 10, whereby the parts are supported at the outer edge while the inner edge is supported by the various gear wheels 11 meshing with the rack 12, which rack is rigidly secured to the bars 7. One of the gear wheels 11 is connected with a shaft 13, which shaft carries a second gear wheel 14 over which a chain 15 passes, said chain also passing over a sprocket wheel 16 rigidly secured to shaft 17. Shaft 17, as shown in Fig. 1, is designed to convey power from any suitable source to chain 15 and to the beveled gear 18 which meshes with gear 19 so as to rotate the standard 20 to which it is rigidly secured, said standard being guided and held in proper place by bearings 21 and 22.

As described, the conveyer 4 is intended to remove the unnecessary and undesired solids which are discharged from the various filtering sections 23, which filtering sections are successively dumped, as shown in Figs. 1 and 4. In the drawings a certain number of filtering sections 23 have been shown but it is evident that a larger or less number may be used without departing from the spirit of the invention, said filtering sections remaining in the same relative position but being successively dumped by mechanism hereinafter fully described and successively supplied with the solution to be filtered, said solution being supplied through the pipes 24 and 25. The idea in this connection is to supply one or more kinds of solution to be filtered and to supply the same in a continuous stream but to intermittently act on the filtering sections 23 so that during the rotation of the supply pipes 24 and 25 the various filtering sections 23 will be in different stages of operation, each filtering section completing the entire cycle of operation on each rotation of the pipe 24. The matter filtered may be any solid in suspension from which the suspending liquid is to be extracted and possibly some of the solid remaining to be submerged again and filtered before discharged from the filtering device.

Figure 2:
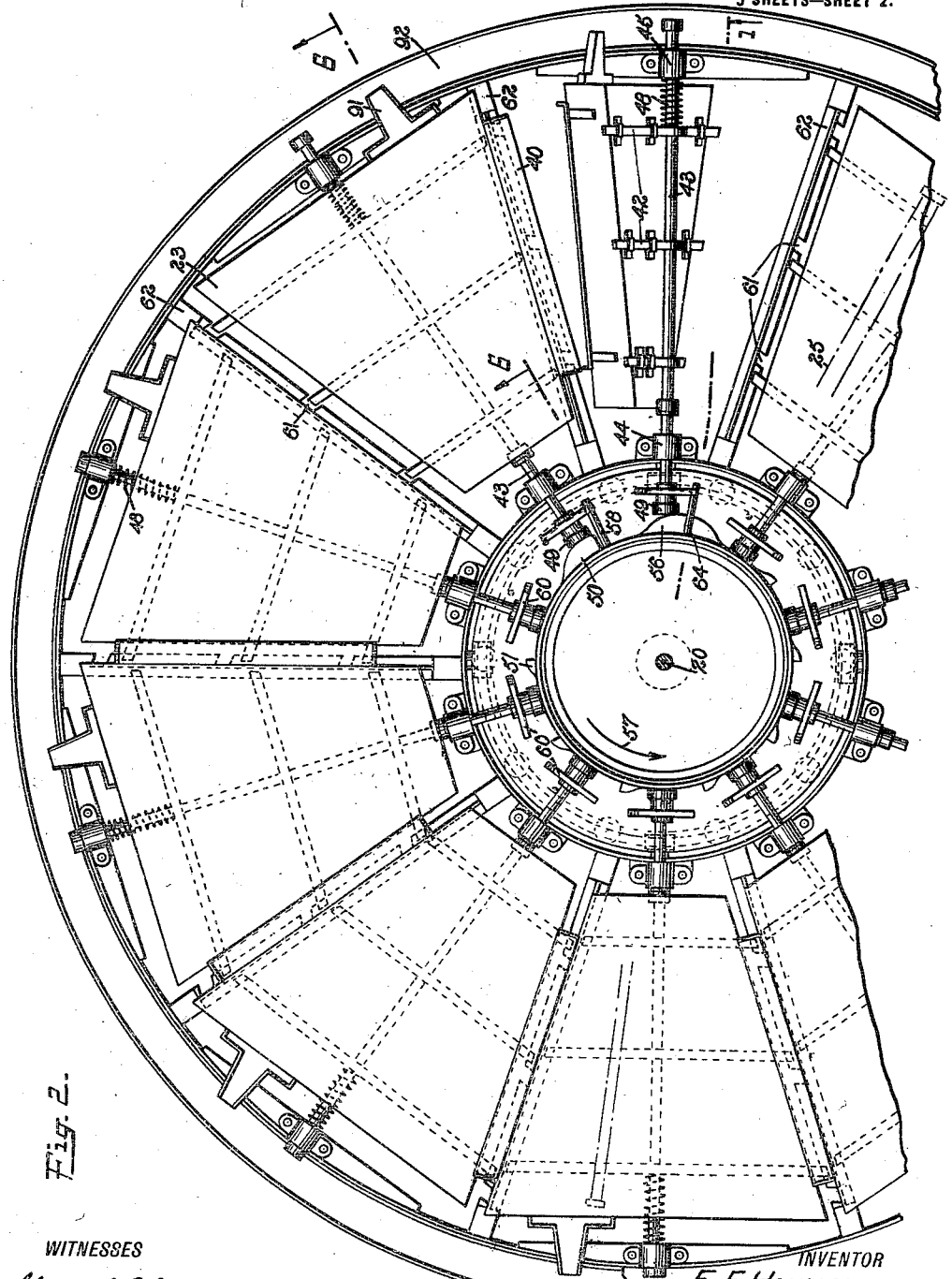
Fig. 2 is a section through Fig. 1 on line 2—2.

As shown in Figs. 1 and 2, the supply pipes 24 and 25 are connected to the rotating tanks 26 and 27, respectively, said tanks being preferably rigidly secured to shaft 20 so as to rotate therewith. Pipes 28 and 29 supply different solutions to the tanks 26 and 27, said pipes being stationary and disconnected from the tanks so that the tanks may freely rotate and distribute the solution or the matter in suspension as the pipes rotate. Pipe 28 preferably supplies the mixture to be filtered while pipe 29 supplies wash water to wash out the residual values of the precipitate, which wash water is drawn off separately from the first run of the filter. The upper edge of the tank 26 is turned over at 30 and fits into a trough 31 so as to receive any matter spilled therefrom, said overflow being led to a suitable discharge point through pipe 32. As will be evident, when the device is started the solution from pipe 24 is discharged continuously as the same rotates, whereby the various filtering sections 23 are successively supplied with the solids in suspension and also with a solution from pipe 25 which may be any suitable solid in suspension or may be water or any other fluid. The reason that the pipes 24 and 25 are spaced at such a great distance apart is to allow the filter to act on the matter discharged from pipe 24 before the matter discharged from pipe 25 is supplied to the respective filtering sections.

Each of the filtering sections 23 is supplied with a solid bottom 33 (Fig. 6) having suitable side walls 34 at the sides and ends, to which may be secured a filtering substance 35 consisting of a wire or coarse mesh member 36 and a fine mesh or cloth member 37. Suitable supporting sleeves 38 are provided and held in place by bolts 39 so as to support the filtering medium 35 properly when the matter to be filtered has been discharged thereon. On each of the filtering sections 23 is arranged an overhanging member 40 which prevents any spilling of the material between the filters, as the matter discharged on any of the members 40 will gravitate into the next adjacent filter and be properly acted on thereby. As shown in Figs. 1 and 6, a plurality of cleats 41 are secured to the bottom 33 of the various filtering sections 23 so as to clamp the bars 42 in position, said bars being rigidly secured to shaft 43, which shaft is supported in suitable journal members 44 and 45 on upright members 46 and 47. A spring 48 bears against the outer bar 42 and against the bearing 45 so as to continually urge the filter 23 radially inwardly. This action is to cause the jarring of the entire filter 23 under certain circumstances, as hereinafter described, so as to shake out any of the solids remaining on the filtering section 23 when the filter has been turned, as shown in Figs. 1 and 4. As shown in Figs. 1 and 2, a cap 49 is mounted on the end of each of the shafts 43 for reducing the friction between said shafts and the jarring cams 50 and 51 mounted on the tubular member or wall 52. It will be observed that the tubular member or wall 52 is rigidly secured to the shaft 20 and also is rigidly secured to a ring 53 carrying the rack 54, which rack is mounted on suitable pinions 55 whereby said rack is properly supported. As shown in Fig. 2, there is provided one large jarring member 50 and a number of small jarring members 51, together with a double face cam 56.

When the member 52 and associated parts are moving in the direction of the arrow 57, as shown in Fig. 2, a small jarring cam 51 will engage the various caps 49 and will give the filtering sections 23 a short outward movement, and by reason of the spring 48 the filters will be given a quick inward movement until the caps strike the member 52, thus producing a slight jar in order that the matter being filtered may be jarred or shaken so as to allow a better filtering action. When a filtering section 23 reaches the large cam 50 it is moved outwardly by the cam and then quickly inwardly by the spring 48 so as to be given a considerable jar. This jar occurs when the filter has been tilted to the position shown in Figs. 1 and 4, whereby the old solid matter left on the filter will be jarred off and caused to fall on to the conveyer 4.

In order that the various filters 23 may be turned or tilted as shown in Figs. 1 and 5 at the proper time, a tilting pin 58 enters the notch 59 of lever 60, as shown in Figs. 4 and 5, thus causing said lever to be rotated as the pin is moved along. The rotation for a distance of approximately 45° will turn the filter 23 a corresponding distance by reason of the fact that the lever 63 is rigidly secured to shaft 43 and, consequently, the shaft and filter turn with the lever. This turning operation is approximately completed at the time the cap 49 slips off the large cam 50. The particular filter 23 which has been tilted remains in a tilted position until the double cam 46 strikes the cap 49 and again moves the same outwardly against the action of spring 48, said movement continuing until the projecting ends of the bars 42 come in alinement with the notches 61 in the supporting bars 62 and then the upper notch 63 of lever 60 will engage the re-tilting pin 64, and as this pin moves with member 62 the filter will be again moved to its horizontal position. After the pin has moved to its horizontal position the cap 49 gradually slides off the end of cam 56 and, consequently, the filter is returned to its original position without a jar and the extending ends of the bars 42 are moved out of registry with the notches 61, whereupon the supporting bar 62 acts as a support for that side of the filter while the overhanging member 40 overlaps the next adjacent filter. In this way each of the filters 23 is shaken a number of times by the small cams 51 and given one large jar by the cam 50 as the tubular member or drum 52 rotates. In addition, each of the filters 23 is tilted by the pins 58 and 64, respectively, so as to dispose of or discharge the solid matter into the space between the walls 2 and 3 whereby the conveyer 4 may move the same to the discharge point 5.

After the pipes 24 and 25, respectively, have discharged certain matter into the respective filters, the liquid and part of the solids are extracted therefrom by suction, said suction beginning immediately after the discharge of the matter into the filters or during the discharge thereof, and automatically coming into operation and moving out of operation by reason of a plurality of arms 65 properly positioned on the ring 53 or the rack 54 and moved thereby so as to operate the various valves 66 in proper timed relationship to the operation of the pipes 24 and 25 and the tilting of the filters 23. It will be noted that there is one valve 66 for each of the filters 23 and that these valves are all connected to pipes 67, 68, 69 and 70.

Immediately after the pipe 24 has supplied solution to the filter 23 the valve connected therewith is turned by one of the arms 65 so that the vacuum pipe 70 will be turned on and the liquid part of the solution will be sucked through pipe 70 to a discharge point, said liquid carrying with it some of the solids or only liquid matter, according to the fineness of the filtering medium on the filter. After this has been carried on for a predetermined length of time the next arm 65 will strike the valve and move the same a predetermined distance, whereupon the passageway to the second vacuum pipe 69 is opened. Simultaneously with connecting pipe 69 with the filter or previous thereto, a quantity of submerging fluid is discharged by pipe 25 so that this submerging fluid is removed through the vacuum pipe 69 and with it certain of the solids, as the case may be. Pipe 69 is connected with the filter for a less time than the pipe 70. At a predetermined time the pipe 69 is cut off by another arm 65 operating the valve 66, whereupon not only will pipe 69 be cut off but a pipe 68 connected to the filter for supplying a stirring and mixing medium, as for instance, air or water, will be turned on or connected for supplying air or water a short time to the filter. After the air or water has been supplied for a predetermined time, a fourth arm engages the valve 66 and operates the same for turning off pipe 68 and turning on pipe 67, said last mentioned pipe being a drainage pipe so as to drain off the water or to allow the air to circulate in case air is being used. This last operation occurs approximately at the time the filter is tilted and may occur just before or after or during the tilting operation. In order that the pipes 67 to 70 may communicate through the various valves 66 to the various filters 23, a pipe 71 is connected to the bottom of each filter, as shown in Fig. 6, and to the respective valves 66, there being one pipe 70 and one valve 66 for each filter, these members remaining stationary except for the tilting operation of the filters and the movement of the valve, plug and associated parts in the valves. It is of course understood that a fifth arm 65 is provided for turning off the pipe 67 so that the valve 66 will be closed.

Figure 8:
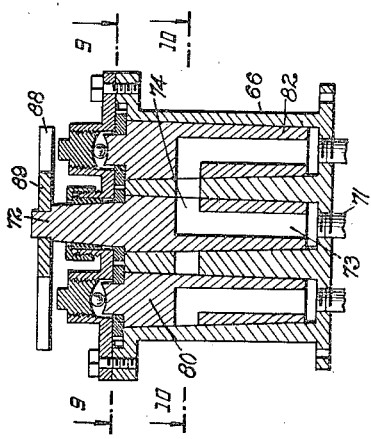
Fig. 8 is a sectional view through Fig. 7 on line 8—8.

The detail construction of the valve 66 may be varied in a number of particulars, provided the same accomplishes the results above mentioned. A preferable construction of valve is shown in Figs. 7 to 10, inclusive, in which there is provided a central master plug 72 connected with the pipe 71, said plug having a central passageway 73 merging into a radiating passageway 74 adapted to register at different times with the passageways 75, 76, 77 and 78. Associated with the master plug 72 are auxiliary plugs 79, 80, 81 and 82 formed with vertical passageways, as shown in Fig. 8, merging into radial passageways adapted to register at different times with the passageways 75 to 78, inclusive. The plugs 79 to 82, inclusive, are connected to the respective pipes 67 to 70, inclusive, so that any of the pipes 67, 68, 69 or 70 may be caused to communicate with pipe 71. The master plug 72 is provided with a centrally arranged gear 83 (Fig. 8) which meshes with the gears 84, 85, 86 and 87 connected with the auxiliary plugs, whereby when the master plug is turned a predetermined distance the auxiliary plugs will be turned the same distance, whereby the proper passageways may be brought into registry. The fifth arm 65 above mentioned is intended to move the arm 88 of the operating plate 89 a proper distance for shifting the last plug and associated plugs for preventing a communication of any of the auxiliary plugs with the master plug.

Figure 11:
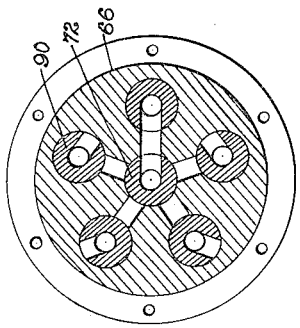
Fig. 11 is a view similar to Fig. 10 but showing a slightly modified form of valve.
Figure 7:
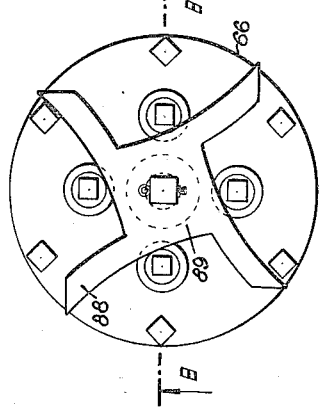
Fig. 7 is a top plan view of a valve disclosing certain features of the invention.
Figure 10:
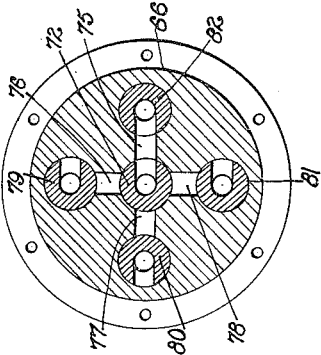
Fig. 10 is a horizontal sectional view through Fig. 8 on line 10—10.

In Fig. 11 will be seen a view similar to Fig. 10, showing a slightly modified form of the invention in which there are provided five auxiliary plugs 90 instead of four auxiliary plugs as shown in Fig. 10. This arrangement is provided where it is desirable to have another pipe or tube for drawing off certain of the liquid matter.

In operation, the power shaft 17 is started and as soon as the same, together with the parts connected thereto, has attained the speed desired the matter in suspension is discharged into the tanks 26 and 27 and is allowed to flow therefrom through pipes 24 and 25 so as to supply the various filters 23 with proper quantities of the matter in suspension. Preferably the pipe 35 is turned off until it has reached the particular filter first supplied with the matter in suspension from pipe 24, whereupon it is turned on and left turned on as long as the device is in operation. The pipes 24 and 25 are continually rotated at a predetermined speed without any stops in order to successively supply the matter to be filtered to the various filters 23. The filters 23 are successively tilted and re-tilted after having gone through the previous steps in the process of filtration.

It will be noted from Fig. 2 that in case an excessive quantity of material is supplied to any particular filter said excessive material may flow out the overflow chute 91 into an annular trough 92 which has a suitable discharge (not shown) for leading the overflow to a convenient discharge point. In this way an ample quantity is assured for the respective filters while none of the material is wasted, as it may be again forced through pipes 28 and 29 to tanks 26 and 27. This is especially true as the overlapping members 40 prevent any spilling between the filters and any slight spilling on the inner end of the filters is directed by the deflector 93 into the conveyer 4 and is moved from thence to the discharge point 5. As the material is constantly supplied and moved at a uniform rate the resulting filtration or extraction is constant and of a given quantity per unit of time, so that an easy estimate may be made of the output of any particular device and, consequently, the cost of filtering any given quantity of material.

What I claim is:

1. In a filtering device of the character described, a plurality of filtering members disposed around a common axis and stationary relative to said axis, means for successively supplying said filtering members with a matter in suspension to be filtered, means for drawing off the filtered matter from said filtering members, a carrier mounted to revolve about said axis and below the filtering members on which the filtering members are adapted to discharge, and means for tilting said filtering members so as to discharge the residue therefrom.

2. In a filtering device of the character described, a plurality of filters disposed around a common axis, and stationary relative to said axis, a carrier mounted to revolve about said axis, said carrier being positioned below said filters for receiving a discharge therefrom, means moving around said axis for successively tilting and retilting said filters so as to cause the same to discharge the residue on said carrier, means for supplying matter to be filtered, and means for drawing off the filtrate from said filters before they are tilted.

3. In a filtering device of the character described, a plurality of filters, means for supplying successively material to the filters, means for drawing off part of said material after it has passed through the filtering medium of the filters, means for shaking the filters during the drawing off operation, means for tilting the filters successively, means for shaking the filters immediately after the tilting operation, and means for retilting the filters successively.

4. In a filtering device of the character described, a revolving supply tank, a distributing member extending from said supply tank and moving therewith, a series of stationary filtering members arranged in a circle adapted to be supplied with matter to be filtered from said distributing member, means for tilting said filtering members so as to discharge the residue therefrom, and means for shaking said filtering members at the time of tilting.

5. In a filtering device of the character described, a pivotally mounted filtering member, means for shaking said filtering member, means for tilting the filtering member substantially simultaneously with the shaking thereof, and means for supplying matter to be filtered to the filtering member before the tilting operation.

6. In a filtering device of the character described, a plurality of filtering members, means for pivotally mounting each of said members, means for holding said members normally in a horizontal position, means for supplying matter to be filtered to said members successively, means traveling past said filtering members for tilting and re-tilting the same, and means for shaking the filtering members at the time of tilting.

7. In a filtering device of the character described, a plurality of filtering members, a movable distributing member arranged to pass over said filtering members, an apron extending from each filtering member so as to overlap the next adjacent filtering member in order to prevent any loss of material when the distributing member passes from one filtering member to the other, means for supplying said distributing member with material to be distributed, and means for leading to a proper discharge the matter passing through said filtering members.

8. In a filtering device of the character described, a plurality of filtering members, means for distributing matter to be filtered to said filtering members, means for pivotally supporting each of said filtering members, a dumping mechanism for tilting and re-tilting said filtering members, means for jarring said filtering members while in a tilted position, and a carrier arranged beneath said filtering members for moving the matter dumped from the filtering members to a discharge point.

9. In a filtering device of the character described, a plurality of tiltable filters, means for supplying matter to be filtered to the filters, means for tilting said filters so as to discharge matter resting thereon, means for jarring said filters when in a tilted position, a trough construction for receiving the matter discharged from the filters when the same are tilted, a carrier arranged in said trough structure for moving the matter discharged therein to a discharge point, and means for moving said carrier during the operation of the device.

10. In a filtering device of the character described, a plurality of tiltable filters arranged in a circle and in the same horizontal plane, each of said filters being movable radially, a spring for moving said filters in one direction, a cam for moving said filters in the opposite direction, means for successively tilting said filters, means for supplying the filters with matter to be filtered, and means for drawing off the filtered matter previous to the tilting of the filters.

11. In a filtering device of the character described, a plurality of filters arranged in a circle, each of said filters being movable radially, a spring for moving the filters in one direction, cams for moving the filters in the opposite direction, said cams having an abrupt end whereby the filters are given a jar when moving off the respective cams, means for supplying matter to be filtered to the respective filters, and means for drawing off the filtered matter.

12. In a filtering device of the character described, a plurality of filtering members arranged in a horizontal plane and in a circle, means for pivotally mounting each of said filters independently, an arm having a notch at each end connected with each of said filters, a rotatable member arranged centrally of the filtering members, a pair of spaced pins engaging the respective notches in said arms at different times for tilting and re-tilting the filters as the rotatable member moves said pins, means for supplying matter to be filtered to said filters, means for withdrawing from the filters the filtered matter, and means for moving to a discharge point the residue discharged from the filtering members upon the tilting thereof.

13. In a filtering device of the character described, a plurality of filters, means for supplying said filters successively with matter to be filtered, the same being in suspension, a tube for drawing off the liquid matter from each of the filters, a valve for each of said tubes, said valves being provided with a master plug and an auxiliary plug for each step in the extraction of the liquid from the filters, and a movable member formed with means acting on the valves for causing the plugs thereof to be turned in proper timed relationship to the action of the device so as to successively turn on the various tubes connected to said valves.

ELLIS EDGAR HOWSON.